United States Patent [19]

Heller et al.

[11] Patent Number: 5,414,020
[45] Date of Patent: May 9, 1995

[54] PROCESS FOR THE PREPARATION OF ANION EXCHANGE RESINS OF THE POLY(METH)ACRYLAMIDE TYPE

[75] Inventors: Harold Heller, Cologne; Friedrich Werner, Roesrath-Forsbach; Alfred Mitschker, Odenthal-Holz; Axel Ingendoh, Odenthal-Oseanau, all of Germany

[73] Assignee: Bayer Aktiengesellschaft, Leverkusen, Germany

[21] Appl. No.: 160,453

[22] Filed: Dec. 1, 1993

Related U.S. Application Data

[63] Continuation of Ser. No. 987,095, Dec. 7, 1992, abandoned, which is a continuation of Ser. No. 718,710, Jun. 21, 1991, abandoned.

[30] Foreign Application Priority Data

Jun. 30, 1990 [DE] Germany .................. 40 20 943.1

[51] Int. Cl.$^6$ .................. C08F 8/32; B01J 41/08; B01J 41/12
[52] U.S. Cl. .................. 521/32; 521/25; 521/30; 525/330.5; 525/374; 525/379; 525/381; 525/382
[58] Field of Search .............. 521/32; 525/330.5, 381, 525/382

[56] References Cited

U.S. PATENT DOCUMENTS 2,675,359  4/1954  Schneider .................. 521/32

FOREIGN PATENT DOCUMENTS 0213719  3/1987  European Pat. Off. .

OTHER PUBLICATIONS

"Handbook of Chemistry and Physics" 47th Ed., D-1,9,10,15,17, (1966) Chemical Rubber (Cleveland).

*Primary Examiner*—Fred Zitomer
*Attorney, Agent, or Firm*—Sprung Horn Kramer & Woods

[57] ABSTRACT

According to the process according to the invention for the preparation of anion exchange resins of the poly(-meth)acrylamide type by aminolysis of bead polymers of cross-linked poly(meth)acrylic acid esters with excess polyamine, subsequent separation of the anion exchange resins from the liquid phase containing the unreacted polyamine, washing the anion exchangers free of amine with water and recovering the polyamines from the washing waters, the liquid phase containing the unreacted polyamine and the polyamine-containing washing waters are immediately mixed with the bead polymer of cross-linked poly(meth)acrylic acid ester to be subjected to aminolysis, the amount of fresh polyamine necessary for the establishment of the desired polyamine excess is added to the mixture, the mixture thus obtained is distillatively dewatered until its water content has fallen to a value of <7% by weight and the mixture remaining after this distillative dewatering is subjected to aminolysis in the customary manner.

5 Claims, No Drawings

PROCESS FOR THE PREPARATION OF ANION EXCHANGE RESINS OF THE POLY(METH)ACRYLAMIDE TYPE

This application is a continuation of application Ser. No. 07/987,095, filed Dec. 7, 1992, now abandoned, which was a continuation of application Ser. No. 07/718,710, filed Jun. 21, 1991, now abandoned.

Anion exchangers of the poly(meth)acrylamide type are an important type of anion exchanger much used in practice. There is therefore great interest in economical preparation processes for this type of anion exchange resin.

A known process for the preparation of anion exchangers of the poly(meth)acrylamide type comprises the aminolysis of cross-linked acrylic acid ester bead polymers with polyamines (see, for example: U.S. Pat. No. 2,675,359, East German Patent Specification 99,587; Czechoslovak Patent Specification 169,356). For the aminolysis, the polyamines are employed in a large excess. For the efficiency of this process, a recovery which is as quantitative as possible of the polyamine employed in excess is of great importance. This recovery has hitherto been carried out as follows: After aminolysis was complete, the anion exchangers were separated from the liquid phase containing the main amount of the excess polyamine; the anion exchangers were then washed with water and, from the washing waters obtained in this washing, the polyamine contained in them was separated by addition of caustic soda. The crude polyamine precipitated by the caustic soda treatment was fractionally distilled together with the polyamine-containing liquid phase.

This recovery process, however, has the disadvantage that using it the polyamines can be recovered in pure form either only by a very complicated fractional distillation or else only with great losses. Owing to the alkylating action of the cross-linked polyacrylic acid esters to be subjected to aminolysis, a certain amount of the polyamine is always alkylated, namely in the aminolysis. These alkylated polyamines, however, differ only insignificantly in their boiling points from the boiling point of the polyamine employed for the aminolysis (for example N,N-dimethyl-1,3-diaminopropane b.p.: 134.8° C./1013 mbar; N,N,N'-trimethyl-1,3-diaminopropane b.p.: 138° C./1013 mbar; N,N,N',N'-tetramethyl-1,3-diaminopropane b.p.:145° C./1013 mbar). The separation of the alkylated polyamines therefore causes great difficulties. On the other hand, however, the separation of the alkylated polyamines is desirable since, owing to their presence, the degree of amidation, i.e. the yield in which the carboxylic ester groups are converted into carboxamide groups, is reduced.

Surprisingly, it has now been found that the known process for the preparation of anion exchange resins of the poly(meth)acrylamide type by aminolysis of bead polymers of cross-linked poly(meth)acrylic acid esters with polyamines can be substantially simplified and thus its efficiency can be substantially improved if the polyamine-containing liquid phase remaining after the separation of the anion exchangers from the aminolysis mixture is not distilled together with the crude polyamine separated from the washing waters by means of caustic soda and the polyamine obtained in the distillation used again for the next aminolysis, but if the remaining liquid phase and the polyamine-containing washing waters are immediately mixed with the bead polymer of cross-linked poly(meth)acrylic acid ester to be subjected to aminolysis, the amount of fresh polyamine necessary for the establishment of the desired polyamine excess is added to the mixture and the mixture obtained is distillatively dewatered until the water content of the mixture has fallen to a value of <7% by weight, preferably of about 6 to 3% by weight. The aminolysis of the poly(meth)acrylic acid ester bead polymer immediately follows the distillative dewatering.

The measure according to the invention of reusing the liquid phase remaining after the separation of the anion exchangers together with the washing waters obtained in the washing of the anion exchanger for the next aminolysis and only removing the water by distillation after the mixing of liquid phase and washing waters with the poly(meth)acrylic acid ester bead polymer to be subjected to aminolysis and after addition of fresh polyamine offers the following advantages: it means a saving of chemicals, caustic soda is no longer required to separate the polyamine; as a result of it the production of the strongly alkaline waste water after the separation of the crude polyamines is avoided; in addition it means a substantial simplification in the working up of the washing waters—the crude polyamine separated by the addition of caustic soda no longer has to be separated off—and above all in the distillation, as the fractional distillation of the mixture composed of polyamine and alkylated polyamines is now no longer necessary. In place of this, the process according to the invention only requires removal of the water by distillation from the mixture comprising separated liquid phase, washing waters, polyamine and bead polymer. However, this removal of the water by distillation only requires a low distillative outlay.

Surprisingly, it has been found that in the distillative dewatering of the mixtures containing liquid phase, washing waters, polyamine and bead polymer neither the expected concentration of the undesired alkylated polyamines in the mixture nor the expected (see East German Patent Specification 143,264) undesired hydrolysis of the polyacrylic acid ester occurs. Surprisingly, it has been found that the undesired alkylated polyamines are largely removed in the distillative dewatering, so that no concentration occurs. The reuse of the liquid phase containing the excess polyamines and their alkylation products therefore leads to no reduction in the degree of amidation. Moreover, the anion exchangers obtained do not have an increased content, but only the usual low content, of weakly acidic groups.

The invention therefore relates to a process for the preparation of anion exchange resins of the poly(meth)acrylamide type by aminolysis of bead polymers of cross-linked poly(meth)acrylic acid esters with excess polyamine, subsequent separation of the anion exchange resins from the liquid phase containing the unreacted polyamine, washing the anion exchangers free of amine with water and recovering the polyamines from the washing waters, which is characterised in that the liquid phase containing the unreacted polyamine and the polyamine-containing washing waters are immediately mixed with the bead polymer of cross-linked poly(meth)acrylic acid ester to be subjected to aminolysis, the amount of fresh polyamine necessary for the establishment of the desired polyamine excess is added to the mixture, the mixture thus obtained is distillatively dewatered until its water content has fallen to a value of <7% by weight, preferably to a value of 6–3% by weight, and the mixture remaining after this distillative dewatering is subjected to aminolysis in the customary manner.

The distillative dewatering according to the invention is preferably carried out by removing the water by distillation through a fractionating column. In this fractional distillation, the alcohol formed in the aminolysis distils off first and then mixtures comprising water, alcohol and alkylated polyamines.

When the temperature of the distillate passing over at the head of the column has reached a temperature of about 100°–110° C., the water content of the bottom (mixture) has been lowered to the desired water content of <7% by weight.

The mixture of bead polymer and polyamine present after the distillative dewatering is then subjected to aminolysis in the customary manner, i.e. heated—optionally in an autoclave—with stirring to temperatures of 130°–200° C., kept at this temperature for about 5–30 hours and then cooled.

After cooling, the anion exchanger is separated off mechanically, for example filtered off with suction, and the filtrate, the polyamine-containing liquid phase, is collected. The anion exchanger is then washed with water or aqueous solutions until free of amine.

Washing free of amine is preferably carried out by suspending the anion exchanger in water several times, preferably in countercurrent with reuse of the relatively polyamine-poor washing water fractions obtained in the preceding batch. With a four-stage washing, for example, the relatively polyamine-rich washing water fractions obtained after the washing in the 1st and 2nd stages are combined with the polyamine-containing liquid phase from the aminolysis and mixed with the bead polymer to be subjected to aminolysis. The relatively polyamine-poor washing water fractions obtained after washing the anion exchanger in the 3rd and 4th stages, however, are reused as washing water fractions 1 and 2 for washing the anion exchanger obtained in the following batch.

To remove the last traces of polyamine, the anion exchanger is packed into a column and washed with demineralised water until the washing water has a neutral reaction.

In the process according to the invention, the copolymers of lower acrylic acid or methacrylic acid alkyl esters and at least one cross-linking agent, for example divinylbenzene, customarily used for the preparation of anion exchangers of the poly(meth)acrylamide type are used as bead polymers of cross-linked poly(meth)acrylates. Such (meth)acrylic acid esters to be used for the preparation of anion exchangers of the poly(meth)acrylamide type are described, for example, in EP-A 32,671. The polymers can be gelatinous or macroporous.

A cross-linked (meth)acrylic acid ester resin in bead form is prepared in a known manner by copolymerisation of a lower acrylic acid alkyl ester or methacrylic acid alkyl ester with at least one crosslinking agent. Esters which are particularly suitable are methyl acrylate and ethyl acrylate. Examples of suitable crosslinking agents are divinylbenzene, divinyltoluene, divinylnaphthalene, divinylethylbenzene, N,N'-methylene-diacrylamide, N,N'-methylenemethacrylamide, N,N'-ethylenediacrylamide, trivinylbenzene, trivinylnaphthalene, polyvinyl ethers of polyols, such as ethylene glycol, glycerol and pentaerythritol, and aliphatic and cycloaliphatic hydrocarbons with at least two allyl groupings, such as hexa-1,5-diene, dimethylhexa-1,5-diene, octa-1,7-diene and trivinylcyclohexane. Divinylbenzene and mixtures of divinylbenzene and aliphatic hydrocarbons with at least two allyl groupings, or polyol-polyvinyl ethers have proved particularly suitable as crosslinking agents Divinylbenzene is advantageously employed in an amount of 2 to 20% by weight, and the said aliphatic hydrocarbons or polyolpolyvinyl ethers are advantageously employed in an amount of 2 to 12% by weight, in each case relative to the total amount of monomers. The cross-linked (meth)acrylic acid ester resins can be prepared as gel-like or macroporous resins. Macroporous resins are obtained when the bead polymerisation is carried out, for example, in the presence of organic solvents in which the monomers dissolve but in which the polymer is insoluble and cannot be swelled or can scarcely be swelled. Examples of such organic solvents are aliphatic hydrocarbons, alcohols, esters, ethers, ketone, trialkylamines and nitro compounds. They are usually employed In an amount of up to 100% by weight, relative to the total weight of the monomers. The copolymerisation is usually carried out by the suspension polymerisation process in the presence of a free radical initiator, such as benzoyl peroxide or an azo compound, for example azo-bis-isobutyronitrile, in the temperature range from 20° to 120° C. and using customary suspension stabilizers.

The aminolysis is carried out using the polyalkylene polyamines customarily used for the preparation of anion exchangers of the poly(meth)acrylamide type. Such polyalkylene polyamines are, for example, propylenediamine, diethylenetriamine, dipropylenetriamine, triethylenetetramine, tetraethylenepentamine, aminoethyl-piperazine, N,N-dimethylethylenediamine and N,N-dimethylpropylene-1,3-diamine. N,N-dimethylpropylene-1,3-diamine is preferably used.

The weakly basic anion exchangers of the crosslinked poly(meth)acrylamide type obtainable by the process according to the invention can subsequently be converted into the corresponding medium basic or strongly basic anion exchangers by means of partial or complete alkylation.

EXAMPLE 293.3 g (~2.5 mol of ester groups) of the macroporous, cross-linked methyl acrylate bead polymer, whose preparation is described below (water content of the bead polymer: 14.75% by weight), were suspended in a mixture of 1,147 g (11.2 mol) of N,N-dimethyl-1,3-diaminopropane (99.9% strength) and 250 g of completely demineralised water. The suspension was then dewatered by fractional distillation using a packed column (column dimensions: 800×24 mm; number of theoretical plates: about 16) to a residual water content of 3.9% by weight.

The dewatered suspension was heated in an autoclave at 180° to 182° C. with stirring for 24 hours. After cooling, the anion exchange resin was filtered off with suction from the liquid phase. The liquid phase was kept for the next batch.

In order to wash the anion exchanger free of amine, this was stirred 4 times successively for 30 minutes each time with 700 ml of completely demineralised water each time and again filtered off with suction. The washing waters (W1, W2, W3, W4) obtained in this 4-stage washing were collected separately. (Water content of these four recovered washing waters: W1: 58% by weight; W2: 83% by weight; W3: 94% by weight; W4: 98% by weight). The washing waters W1 and W2 were reused in batch 2 for the aminolysis of the methyl acrylate bead polymer together with the separated liquid phase.

Finally, the anion exchanger was transferred to a filter tube and washed with completely demineralised water until the effluent was amine-free. The consumption of water for this purpose was about 2 bed volumes.

1,420 ml of anion exchanger were obtained.

Content of weakly basic groups in the anion exchanger: 1.62 mol/l

Content of weakly acidic groups in the anion exchanger: 0.14 mol/l

The macroporous, cross-linked methyl acrylate bead polymer used had been obtained as follows: 291.5 g of isododecane and 19.4 g of dibenzoyl peroxide (75% strength) were dissolved in a mixture of 2,162 g of methyl acrylate, 193.5 g of technical grade divinylbenzene (content of pure divinylbenzene: 62.8% by weight; remainder ethylstyrene) and 73 g of 1,2,4-trivinylcyclohexane. An aqueous solution of 4.5 g of methylcellulose and 0.15 g of sodium nitrite in 3,000 g of completely demineralised water was then added to the solution and the mixture was then subjected to bead polymerisation, first for 5 hours at 65° C. and then for a further 2 hours at 90° C. Yield: 2,792 g of moist bead polymer Water content: 14.75% by weight Particle size: 0.125–1.6 mm In batches 2 to 10, the procedure was as follows:

293.3 g of the same bead polymer as had been used for batch 1 were suspended using the liquid phase obtained in the preceding batch and the washing waters W1 and W2 obtained in the preceding batch. An amount of fresh N,N-dimethylamino-1,3-diaminopropane was added to the suspension such that the total content of N,N-dimethyl-1,3-diaminopropane in the suspension was again 11.2 mol. (The amounts of liquid phase and washing waters W1 and W2 obtained in individual batches and reused in the following batches, the total content of amines (N,N-dimethyl-1,3-diaminopropane=amine 1; N,N′-trimethyl-1,3-diaminopropane=amine 2; N,N,N′N′-tetramethyl-1,3-diaminopropane=amine 3) in liquid phase and washing waters, the amount of freshly added amine 1 and the content of amines 1, 2 and 3 and of water in the suspensions before and after dewatering are collated in Table 1 below).

The suspensions thus obtained were dewatered to a water content of about 5% by weight by fractional distillation using the fractionating column used in batch 1.

The dewatered suspensions were subjected to aminolysis under the conditions described in batch 1. The other process steps described in batch 1, separation of the anion exchange resin, washing by suspending 4 times in water and final washing in a filter tube and the further treatment of the liquid phase and washing waters W1, W2, W3, W4 obtained in these process steps were also carried out as described for batch 1, the only differences being that completely demineralised fresh water was not used for the 1st and 2nd washings of the separated anion exchanger, the washing water 3 obtained in the preceding batch was used for the 1st wash and the washing water 4 obtained in the preceding batch was used for the 2nd wash.

The yields of anion exchangers obtained in the individual batches 2 to 10 and their contents of weakly basic and weakly acidic groups are indicated in Table 2 below.

TABLE 1

| | | Content of the suspensions of the individual batches before dewatering | | | | | | | | | Content of the suspensions of the individual batches after dewatering | | | |
|---|---|---|---|---|---|---|---|---|---|---|---|---|---|---|
| | | Transferred amounts of | | | | | | Amount of added | Total amount | | | | | |
| | From | Liquid phase | Washing water | | Amines | | | Amine | | | | | | |
| Batch No. | batch No. | [g] | W1 [g] | W2 [g] | Amine 1 [mol] | Amine 2 [mol] | Amine 3 [mol] | 1 [mol] | Amine 1 mol] | H₂O [% by wt.] | Amine 1 [mol] | Amine 2 [mol] | Amine 3 [mol] | H₂O [% by wt.] |
| 2 | 1 | 394 | 589 | 634 | 5.3 | 0.8 | 0.14 | 5.9 | 11.2 | 41 | 10.5 | 0.70 | <0.01 | 3.5 |
| 3 | 2 | 503 | 602 | 618 | 6.7 | 1.1 | 0.16 | 4.5 | 11.2 | 41 | 10.9 | 1.07 | 0.02 | 5.5 |
| 4 | 3 | 528 | 618 | 672 | 6.6 | 1.4 | 0.23 | 4.6 | 11.2 | 39 | 11.0 | 1.20 | 0.01 | 4.3 |
| 5 | 4 | 539 | 573 | 690 | 6.5 | 1.5 | 0.25 | 4.7 | 11.2 | 36 | 11.0 | 1.10 | 0.02 | 6.4 |
| 6 | 5 | 571 | 609 | 679 | 6.7 | 1.5 | 0.24 | 4.5 | 11.2 | 37 | 9.4 | 1.27 | 0.04 | 4.5 |
| 7 | 6 | 381 | 613 | 669 | 5.7 | 1.3 | 0.19 | 5.6 | 11.3 | 38 | 11.1 | 1.10 | 0.02 | 3.4 |
| 8 | 7 | 539 | 641 | 693 | 7.1 | 1.4 | 0.20 | 4.2 | 11.3 | 41 | 11.3 | 1.15 | 0.02 | 4.4 |
| 9 | 8 | 592 | 626 | 640 | 7.2 | 1.5 | 0.22 | 4.0 | 11.2 | 37 | 11.2 | 1.17 | 0.01 | 5.5 |
| 10 | 9 | 597 | 620 | 633 | 6.9 | 1.5 | 0.23 | 4.3 | 11.2 | 38 | 10.6 | 1.21 | 0.02 | 7.5 |

TABLE 2

| Batch | Yield ml | Weakly basic groups mol/l | Weakly acidic groups mol/l |
|---|---|---|---|
| 2 | 1405 | 1.64 | 0.17 |
| 3 | 1445 | 1.62 | 0.14 |
| 4 | 1450 | 1.53 | 0.14 |
| 5 | 1480 | 1.54 | 0.18 |
| 6 | 1460 | 1.58 | 0.15 |
| 7 | 1460 | 1.60 | 0.16 |
| 8 | 1450 | 1.64 | 0.18 |
| 9 | 1490 | 1.57 | 0.19 |
| 10 | 1500 | 1.57 | 0.17 |
| 0 | 1460 ± 1.9% | 1.59 ± 2.5% | 0.16 ± 11% |

We claim:

1. Process for the preparation of poly(meth)acrylamide anion exchange resins by aminolysis of bead polymers of cross-linked poly(meth)acrylic acid esters with excess polyamine, subsequent separation of the anion exchange resins from the liquid phase containing the unreacted polyamine, washing the anion exchangers free of amine with water and recovering the polyamines from the washing waters, characterised in that the polyamine is N,N-dimethylpropylene-1,3-diamine and the liquid phase containing the unreacted polyamine and the polyamine-containing washing waters are immediately mixed with bead polymer of cross-linked poly(meth)acrylic acid ester which is to be subjected to aminolysis, the amount of fresh polyamine necessary for the establishment of the desired polyamine excess is added to the mixture, the mixture thus obtained is distillatively dewatered until its water content has fallen to a value of <7% by weight and the mixture remaining after this distillative dewatering, comprising the bead polymer to be subjected to aminolysis and polyamine, is subjected to aminolysis in the customary manner.

2. Process according to claim 1, characterised in that the distillative dewatering is carried out by removal of the water by distillation through a fractionating column.

3. Process according to claim 1, characterised in that washing free of amine is carried out in counter-current with reuse of the relatively polyamine-poor washing water fractions obtained in the preceding batch and only the relatively polyamine-rich washing water fractions are combined with the polyamine-containing liquid phase from the aminolysis and mixed with the bead polymer to be subjected to aminolysis.

4. Process according to claim 1 wherein the mixture resulting after the addition of fresh polyamine is distillatively dewatered until its water content has fallen to a value of 6–3% by weight.

5. Process according to claim 1 wherein the distillative dewatering step is conducted at a temperature below the temperature required for aminolysis until the the water content falls to a value <7% by weight and thereafter the temperature is raised to a level at which aminolysis takes place.

* * * * *